United States Patent
Smith et al.

(10) Patent No.: US 6,274,221 B2
(45) Date of Patent: *Aug. 14, 2001

(54) ANGULAR BRIGHTNESS MICROPRISMATIC RETROREFLECTIVE FILM OR SHEETING INCORPORATING A SYNDIOTACTIC VINYL AROMATIC POLYMER

(75) Inventors: Kenneth L. Smith, White Bear Lake; Jaime R. Ojeda, Woodbury; Ronald J. Tabar, St. Paul, all of MN (US)

(73) Assignee: 3M Innovative Properties Company, St. Paul, MN (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/240,342

(22) Filed: Jan. 29, 1999

(51) Int. Cl.$^7$ .................................................. G02B 5/122
(52) U.S. Cl. ......................... 428/141; 428/156; 359/529
(58) Field of Search .................................. 428/141, 156; 359/529; 526/335, 340, 346; 525/70, 98

(56) References Cited

U.S. PATENT DOCUMENTS

| | | | |
|---|---|---|---|
| 3,684,348 | 8/1972 | Rowland | 350/150 |
| 3,712,706 | 1/1973 | Stamm | 350/103 |
| 3,712,716 | 1/1973 | Cornsweet et al. | 351/7 |
| 3,810,804 | 5/1974 | Rowland | 156/245 |
| 3,817,596 | 6/1974 | Tanaka | 350/103 |

(List continued on next page.)

FOREIGN PATENT DOCUMENTS

| | | | |
|---|---|---|---|
| 818 301 | 1/1996 | (EP) | B29C/59/04 |
| 796 716 | 9/1997 | (EP) | B29C/59/04 |
| 62-187708 | 8/1987 | (JP) | C08F/12/08 |
| WO 97/01439 | * 1/1997 | (WO) | |
| WO 97/37249 | * 10/1997 | (WO) | |
| WO 97/37250 | * 10/1997 | (WO) | |
| WO 97/37253 | * 10/1997 | (WO) | |
| WO98/50805 | * 11/1998 | (WO) | |

OTHER PUBLICATIONS

"Plastics Additives Handbook" $3^{rd}$ Edition, by Gachter et al., Hanser Publishers, New York, pp. 189–195, 1990, Copyright Carl Hanser Verlag Munchen Wien 1990. No Month.

"The Current Status of Interpenetrating Polymer Networks" by L.H. Sperling and V. Mishra, *Polymers for Advanced Technologies*, vol. 7 No. 4, 197–208 (Apr. 1996).

"Interpenetrating Polymer Networks" edited by D. Klempner et al., Advances in Chemistry Series #239, 3–38, (1994) No Month.

"Encyclopedia of Polymer Science and Engineering" p. 279, vol. 8 (John Wiley & Sons, New York, 1981. No Month.

* cited by examiner

Primary Examiner—Blaine Copenheaver
Assistant Examiner—Alicia Chevalier
(74) *Attorney, Agent, or Firm*—Alan Ball; Gerald Chernivec; Gary L. Griswold

(57) ABSTRACT

A novel microprismatic retroreflective film or sheeting is provided which comprises a transparent semicrystalline polymer. The microprismatic retroreflective film or sheeting of the present invention offers superior retroreflective brightness at large angles of incidence and at large observational angles. Syndiotactic vinyl aromatic polymers, especially syndiotactic polystyrene and copolymers thereof, are preferred semicrystalline polymers, as they impart good dimensional stability and resistance to moisture, and can be made resistant to UV radiation. Signing materials comprising these microprismatic retroreflective films provide improved performance for off-angle illumination and viewing in traffic control and other signing applications.

17 Claims, 2 Drawing Sheets

U.S. PATENT DOCUMENTS

| | | | |
|---|---|---|---|
| 4,025,159 | 5/1977 | McGrath | 350/105 |
| 4,244,683 | 1/1981 | Rowland | 425/143 |
| 4,332,847 | 6/1982 | Rowland | 428/156 |
| 4,486,363 | 12/1984 | Pricone et al. | 264/1.4 |
| 4,588,258 | 5/1986 | Hoopman | 350/103 |
| 4,601,861 | 7/1986 | Pricone et al. | 264/1.6 |
| 4,775,219 | 10/1988 | Appeldorn et al. | 250/103 |
| 4,895,428 | 1/1990 | Nelson et al. | 350/103 |
| 5,082,717 | 1/1992 | Yaguchi et al. | 428/207 |
| 5,127,158 | 7/1992 | Nakano | 29/849 |
| 5,138,488 | 8/1992 | Szczech | 359/529 |
| 5,145,950 | 9/1992 | Funaki et al. | 430/536 |
| 5,219,940 | 6/1993 | Nakano | 525/133 |
| 5,273,830 | 12/1993 | Yaguchi et al. | 428/523 |
| 5,318,839 | 6/1994 | Arai et al. | 428/329 |
| 5,346,950 | 9/1994 | Negi et al. | 525/57 |
| 5,476,899 | 12/1995 | Funaki et al. | 524/577 |
| 5,496,919 | 3/1996 | Nakano | 528/481 |
| 5,654,365 * | 8/1997 | Havriliak, Jr. et al. | 525/98 |
| 5,706,132 | 1/1998 | Nestegard et al. | 359/529 |
| 5,754,338 * | 5/1998 | Wilson et al. | 359/530 |
| 5,783,120 * | 7/1998 | Ouderkirk et al. | 264/1.34 |
| 5,808,794 * | 9/1998 | Weber et al. | 359/487 |
| 5,932,626 * | 8/1999 | Fong et al. | 522/182 |
| 5,990,256 * | 11/1999 | Newman et al. | 526/340 |
| 6,010,609 * | 1/2000 | Mimura et al. | 205/70 |
| 6,024,455 * | 2/2000 | O'Neill et al. | 359/530 | ns
ANGULAR BRIGHTNESS MICROPRISMATIC RETROREFLECTIVE FILM OR SHEETING INCORPORATING A SYNDIOTACTIC VINYL AROMATIC POLYMER

FIELD OF THE INVENTION

The present invention pertains to retroreflective film or sheeting, and more specifically to retroreflective film or sheeting comprising a microreplicated cube-corner (microprismatic) pattern.

BACKGROUND OF THE INVENTION

Retroreflective film or sheeting utilizing microprismatic reflecting elements is used extensively in signing applications, including signing for traffic control. Microprismatic retroreflectors typically comprise a sheet having a generally planar front surface and an array of cube corner elements protruding from the back surface. Cube corner elements comprise interconnected, generally trihedral structures, each of which has approximately mutually perpendicular lateral faces meeting to form a single corner, and thus are characterized as cube-corners. In use, the retroreflector is arranged with the front surface disposed generally toward the anticipated location of both incident light and intended observers. Light incident to the front surface enters the sheet, passes through the body of the sheet and is internally reflected by the faces of the elements so as to exit the front surface in a direction substantially toward the light source. This is referred to as retroreflection. The light rays are typically reflected at the cube faces due either to total internal reflection (TIR) from interfaces with an intentionally entrapped medium of greatly different refractive index, such as air, or to reflective coatings, such as vapor deposited aluminum.

In general, microprismatics reflect light back toward a light source with high efficiency. In addition, microprismatics can spread the retroreflected light into a zone or "cone of light" determined by the particular cube-corner optical design. This enables detection of reflected light at an observation angle other than zero degrees, with zero degrees defined as the vector of perfect retroreflection. The combination of the cube-corner optical geometry and a material of construction having a high index of refraction serves to maximize entrance angularity, which is to say, to maximize the entrance angle, or angle of incidence, up to which good retroreflective performance is observed. Angle of incidence refers to the angle made by the vector of incident light with a vector normal to the planar front surface of the film or sheeting. Polymeric materials of construction are preferred because of their physical properties; thus, within the realm of polymeric materials typically used in these applications, an index of refraction greater than 1.50 is considered high and is desirable. Several cube-corner optical constructions for signing applications include those described in U.S. Pat. Nos. 3,684,348 (Rowland), 4,588,258 (Hoopman), 5,138,488 (Szczech), and 4,775,219 (Appledorn, et al.). U.S. Pat. No. 3,712,706 (Stamm) recognizes that a certain amount of divergence of the retroreflected light from a microprismatic structure is always present due to optical imperfections. In this patent, said divergence due to optical imperfections is minimized, and the arrangement of the optical elements is established such that the angular divergence of the retroreflected light attributable to diffraction is the dominant diverging factor.

U.S. Pat. No. 3,817,596 (Tanaka) seeks to diffuse the retroreflected light by comprising the retroreflector of two types of optical cube-corner elements, the first variety having three reflecting planes positioned such that lines normal thereto intersect each other at right angles, and a second variety having three reflecting planes positioned such that lines normal thereto intersect in a skewed manner while optical axes thereof intersect each other at right angles.

U.S. Pat. No. 4,775,219 (Appledorn, et al.) provides retroreflective articles which may be individually tailored so as to distribute light retroreflected by the articles into a desired pattern or divergence profile. This is accomplished by forming the three lateral faces of the reflecting elements by three intersecting sets of parallel V-shaped grooves, with at least one of the sets including, in a repeating pattern, a groove side angle that differs from another groove side angle of the same set.

PCT Appl. Ser. No. 96/30786 (Nilsen) seeks to redistribute light within the retroreflected cone by texturing a surface of the retroreflective sheeting which is in the path of the light, in order to decrease the high degree of variation within the cone due to the diffraction phenomena discussed in the Stamm patent.

Combining cube-corner optics with materials of construction which further advance the performance of retroreflective articles has become a primary focus of the industry. Polycarbonates and acrylics are optical quality materials commonly utilized in cube-corner retroreflectors, and polybutyrates have also been utilized, as all three provide good optical properties and are easily processed with conventional forming techniques. A variety of replication techniques for manufacturing microreplicated cube-corner materials from thermoplastics have been known to the art. Some of these are detailed in U.S. Pat. Nos. 3,810,804 (Rowland), 4,244,683 (Rowland), 4,332,847 (Rowland), 4,486,363 (Pricone and Heenan), 4,601,861 (Pricone and Roberts), 5,706,132 (Nestegard, et al.), Eur. Pat. Appl. 796,716 (Fujii, et al.), and Eur. Pat. Appl. 818,301 (Fujii, et al.).

Polycarbonate (PC), which has a relatively high isotropic index of refraction of 1.586, has been a preferred material for microprismatics because it more effectively retroreflects to a source which emits light at large angles of incidence to the microprismatic sheeting. As governed by Snell's law, the higher the index of refraction of a material is, the smaller the critical angle ($\theta_c$) of refraction will be, and thus, the incident angle to which TIR can be achieved within a particular cube-corner element will be larger (FIG. 1). Since less retroreflectivity results as light enters a cube-corner retroreflector at progressively larger angles of incidence, a material which enhances high incidence retroreflectivity, while also enhancing brightness at larger observation angles, would be of particular interest in signing applications. This is particularly true in urban traffic signing applications, where competition from roadway illumination lighting, internally lit signing, automobile headlights, and other light sources may significantly detract from the conspicuity of a retroreflective traffic control device, sign, or the like, and a safety premium is attached to the conspicuity of signage at intermediate distances and wider observational angles. Relatively less activity has been devoted to finding materials which can enhance brightness at larger observation angles than has been the case for finding high-index materials which can improve entrance angularity.

Thus, microprismatic retroreflective materials of the prior art have shortcomings in optical brightness when viewed at wider observational angles or from intermediate distances. Also, the three polymer types from which they are most frequently manufactured are relatively expensive, and are subject to dimensional instability when exposed to moisture. Many other well-known polymeric materials which might otherwise be used in microprismatic retroreflective materials lack sufficient resistance to one or more of the factors involved in "weathering", such as ultraviolet light, heat, moisture, and abrasion. Thus, there is a need in the art for a microprismatic retroreflective material having improved performance at wider observational angles, made from a polymer having an index of refraction at least comparable to that of prior art materials, conventional processability, good weatherability, improved dimensional stability with respect to moisture, and low cost.

These and other needs are met by the present invention, as hereinafter described.

SUMMARY OF THE INVENTION

The present invention is a microprismatic retroreflective film or sheeting, and a signing material comprising said microprismatic retroreflective film or sheeting.

In one aspect of the invention, a microprismatic retroreflective film or sheeting is provided which comprises a transparent semicrystalline polymer. Preferably, the semicrystalline polymer is a syndiotactic vinyl aromatic polymer; more preferably, the semicrystalline polymer is a syndiotactic vinyl aromatic polymer having at least 80% by weight of styrene moieties; and most preferably, the semicrystalline polymer is a syndiotactic polystyrene copolymer. In a particularly preferred embodiment of the invention, the microprismatic retroreflective film or sheeting comprises a transparent semicrystalline polymer comprising a syndiotactic vinyl aromatic polymer comprising at least 80% by weight of styrene moieties and further comprising at least 5% by weight of para-methylstyrene moieties.

In another aspect of the invention, a signing material is provided, comprising the microprismatic retroreflective film or sheeting comprising a transparent semicrystalline polymer, which has enhanced retroreflected brightness with respect to comparable signing material comprising a microprismatic retroreflective film or sheeting consisting of polycarbonate. Preferably, the signing material, comprising the microprismatic retroreflective film or sheeting comprising a transparent semicrystalline polymer, has enhanced retroreflected brightness, at entrance angles greater than about 30°, or at observation angles greater than about 0.20, with respect to comparable signing material comprising a microprismatic retroreflective film or sheeting consisting of polycarbonate.

BRIEF DESCRIPTION OF THE DRAWINGS

The invention may be more completely understood in consideration of the following detailed description of various embodiments of the invention in connection with the accompanying drawings, in which.

Figure 1:
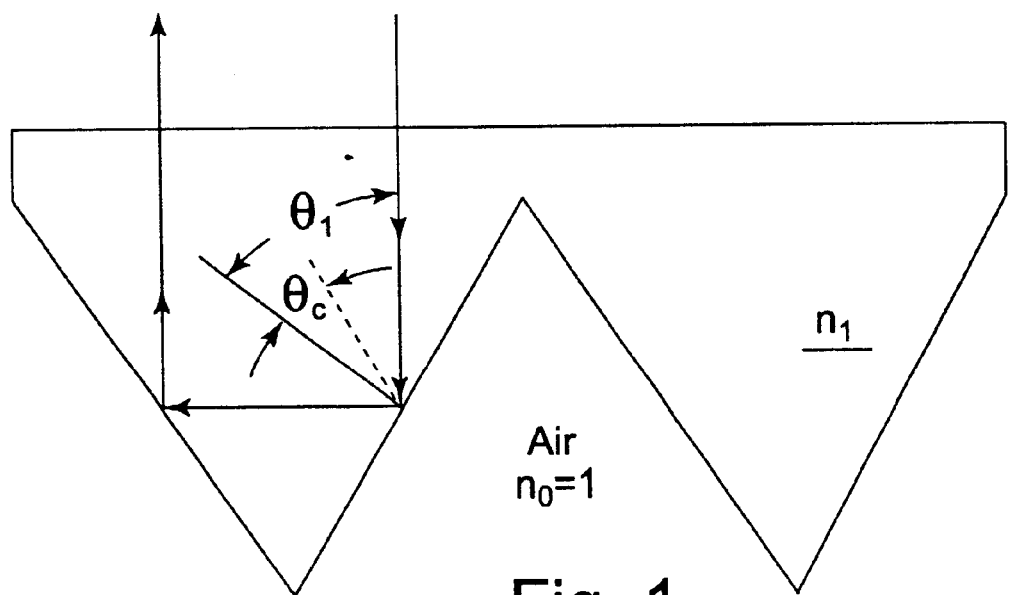
FIG. 1 is a schematic drawing illustrating the concept of Total Internal Reflection (TIR) for a cube-corner element for an angle of incidence smaller than the critical angle (which is a function of the isotropic index of refraction of the material of construction of the cube-corner element)

It should be understood that the invention is not limited to the particular embodiments exemplified in the Drawings, nor those disclosed in the following Detailed Description. On the contrary, the intention is to cover all modifications, equivalents, and alternatives falling within the spirit and scope of the invention as defined by the appended claims. The embodiments are chosen and described so that others skilled in the art may appreciate and understand the principles and practices of the present invention.

DETAILED DESCRIPTION OF THE PREFERRED EMBODIMENTS

Recent developments in catalysis technology have enabled the synthesis of vinyl aromatic polymers, such as polystyrene, that comprise chain segments having a so-called "syndiotactic" configuration. Syndiotacticity refers to one pattern by which vinyl monomers may be added to a growing polymer chain when one of the carbon atoms involved in the monomer's double bond carries two different substituents. Polymerization of such monomers in head-to-tail fashion yields a polymer chain in which every other carbon atom of the backbone is a site of steric isomerism. Such carbon atoms are referred to as "pseudoasymmetric" or "chiral" carbon atoms. Each pseudoasymmetric carbon atom can exist in one of two distinguishable configurations. Depending upon the configurations of such carbon atoms when the corresponding vinyl monomers are added to a growing polymer chain, the resultant chain can be atactic, isotactic, or syndiotactic.

For example, consider a pseudosymmetric carbon atom of a head-to-tail backbone that carries the substituents X and Y. If the polymer backbone is oriented so that the bonds between the main chain carbon atoms form a planar zigzag pattern, then each X and Y substituent will lie either above or below the plane defined by said backbone. If all X substituents lie to one side of the backbone while all Y substituents lie to the other side, then the polymer chain is said to have an isotactic configuration. If the X and Y substituents are randomly distributed above and below the backbone, then the polymer chain is said to have an atactic configuration. If the X and Y substituents appear alternately above and below the backbone, the polymer is said to have a syndiotactic configuration. In other words, the side groups of a syndiotactic polymer chain are arranged in a symmetrical and recurring fashion above and below the backbone when the backbone is arranged so as to lie in a single plane. For example, in the case of syndiotactic polystyrene, phenyl groups (the side groups), are configured alternately above and below the plane defined by the zigzag pattern of the fully extended carbon-carbon main chain. Syndiotacticity is described in Rudin, "The Elements of Polymer Science and Engineering", Academic Press, pages 128–132 (1982).

Syndiotactic vinyl aromatic polymers have been used to make various articles that exhibit good dimensional stability, thermal stability, and/or moisture resistance. The use of syndiotactic polystyrene in overlay films, for example, has been described in Assignee's copending application U.S. Ser. No. 08/761,912, filed Dec. 9, 1996. The use of syndiotactic vinyl aromatic polymers in release liners, including release liners having a microreplicated texture or pattern thereon, has been described in Assignee's copending application Ser. No. 09/240,545, having filed on even date with the present application, and incorporated herein by reference.

Syndiotactic, vinyl aromatic polymers and methods of making these polymers have been described in U.S. Pat. Nos. 5,496,919 (Nakano); 5,188,930 (Funaki et al.); 5,476,899 (Funaki et al.); 5,389,431 (Yamasaki); 5,346,950 (Negi et al.); 5,318,839 (Arai et al.); 5,273,830 (Yaguchi et al.); 5,219,940 (Nakano); 5,166,238 (Nakano et al.); 5,145,950 (Funaki et al.); 5,127,158 (Nakano); and 5,082,717 (Yaguchi et al.). See also Japanese Patent Application Laid-Open No. 187708/1987.

Syndiotactic polystyrene (sPS) has two significant similarities to polycarbonate as a material of construction for a microprismatic retroreflective film or sheet. sPS has a high isotropic index of refraction, n, of 1.585. This is nearly identical to the isotropic index of refraction of polycarbonate, which is 1.586. Further, sPS can be processed into films and sheets having very high transparencies. A significant difference, however, is that sPS is a semicrystalline polymer. This means that sPS can be processed in such a manner that some crystalline structures, or crystallites, are formed. Further, it is known that the crystallites of sPS can be organized into larger structures called spherulites, as is the case for other well-known semicrystalline polymers such as polyethylene, polypropylene (PP), and polyethylene terephthalate (PET).

While it is frequently stated that semicrystalline polymers tend to be opaque, translucent, or hazy, there are many exceptions to this generalization. Examples of transparent semicrystalline polymers include, but are not limited to, poly-4-methyl-1-pentene, nucleated or biaxially oriented PP, biaxially oriented PET, biaxially oriented polyethylene naphthalate (PEN), biaxially oriented polyamide 6, oriented films of polyethylene, and certain constructions (especially films) of polyvinylidene chloride, polyvinylidene fluoride, polyvinyl fluoride, polychlorotrifluoroethylene, poly ethylene-alt-chlorotrifluoroethylene, polyamides (such as nylon 6, nylon 11, nylon 12, nylon 4/6, nylon 6/6, nylon 6/9, nylon 6/10, nylon 6/12, and nylon 6/T), polyaryl ethers (such as polyphenylene ether and the ring-substituted polyphenylene oxides), polyetheretherketone (PEEK), and thermoplastic polyesters (such as PET, PEN, polybutylene terephthalate, polybutylene naphthalate, and poly-1,4-cyclohexanedimethylene terephthalate).

There can be several reasons for a polymer, though semicrystalline, to retain transparency. Essentially, for crystallinity to result in opacity, light must be either reflected, refracted, or absorbed by the polymeric material. For pure polymers, lacking additives, most commonly it is the mechanism of refraction which is responsible for opacity in semicrystalline polymers. For refraction to take place at the interface between a polymer crystallite and the polymer's amorphous phase, the refractive indices of the crystallite and the amorphous phase must differ. Further, the size of the crystalline entity must be at least of the same order of magnitude as the wavelength of the incident light. Furthermore, for refraction to result in opacity or easily-observed deviations from transparency, such as translucency or haziness, the amount of the incident light refracted must be significant. The fraction of light refracted will depend on the amount of crystallinity present, as well as on the difference in refractive indices and the size of crystalline entities.

Thus, a semicrystalline polymer can remain transparent because of any one of at least three factors: (1) its crystalline refractive index very closely matches its amorphous refractive index; (2) the size of its crystalline entities is smaller than the wavelengths of visible light; or (3) the total amount of crystallinity present is too small to result in a substantial amount of refraction. One knowledgeable of these factors will readily understand that interactions among them make it impossible to specifically quantify the level required of any one of them for "transparency".

However for several of the individual cases mentioned above, one of these factors predominates in the preservation of transparency for that specific semicrystalline polymer composition. Thus, poly-4-methyl-1-pentene remains transparent largely because its crystalline refractive index is a nearly perfect match for the refractive index of its amorphous phase. Nucleated polypropylene derives its transparency from the fact that nucleating agents simultaneously create so many centers for crystalline growth upon cooling that no individual crystalline entity can achieve a size on the order of the wavelengths of visible light. Biaxially oriented polypropylene film is manufactured by stretching a precursor film which is considerably less transparent than the finished film. Widely-accepted theory holds that crystalline entities in the precursor film are broken down and re-arranged during the stretching step(s) so that they are no longer large enough to refract visible light. Biaxially oriented polyethylene terephthalate film, on the other hand, is typically manufactured by stretching a transparent and nearly completely non-crystalline precursor film at conditions which, while resulting in a large amount of crystallinity, do not allow the crystalline entities to grow to a size large enough to refract visible light. Many of the other polymer films mentioned above owe transparency to the conditions at which the molten polymer from which they are made is "quenched", or rapidly cooled, such that both the amount and the size of crystalline entities is kept to a minimum. Techniques for rapid quenching of film following extrusion casting are well known in the art, and include casting onto a chilled roll, casting into a water bath, air impingement, and other techniques.

It is significant to note, however, that any transparent semicrystalline polymer retains some finite propensity to refract light, unless all of its crystalline entities are significantly smaller than optical wavelengths, or the refractive index of its crystalline phase is a precise match to its amorphous refractive index. Thus, almost all transparent semicrystalline polymer constructions differ from purely amorphous polymer constructions in their ability to refract, or "scatter", small amounts of the light incident upon them.

The use of sPS as a material of construction for microprismatic retroreflective film or sheeting has been found to result in novel cube-corner articles that combine the advantages of a high index of refraction polymer with that of a slightly diffuse reflector, since the crystalline entities scatter some of the light impinging the cube-corner elements. Depending on the conditions of fabrication and the composition of the polymer resin, sPS microprismatics can be made with a range of crystalline character, resulting in a wide range of optical properties. In one extreme case, sPS microprismatics can be made to have large crystalline entities and be highly crystalline, thus having an opaque appearance. However, sPS microprismatics having low levels of crystallinity are very clear.

The preferred sPS retroreflective articles of the present invention are generally characterized as having a high degree of transparency, normally required for retroreflection, and are further believed to have a distribution (in terms of both size and density) of crystalline structures. The resulting combination of good transparency, high index of refraction, and a small but non-zero amount of light scattering makes sPS an ideal material for increasing retroreflective brightness at wider observation angles. Surprisingly, it has also been observed that sPS, in spite of having an index of refraction not quite equal to that of polycarbonate, provides superior performance at high entrance angles. These phenomena are illustrated in FIGS. 2, 3, and 4.

Figure 2:
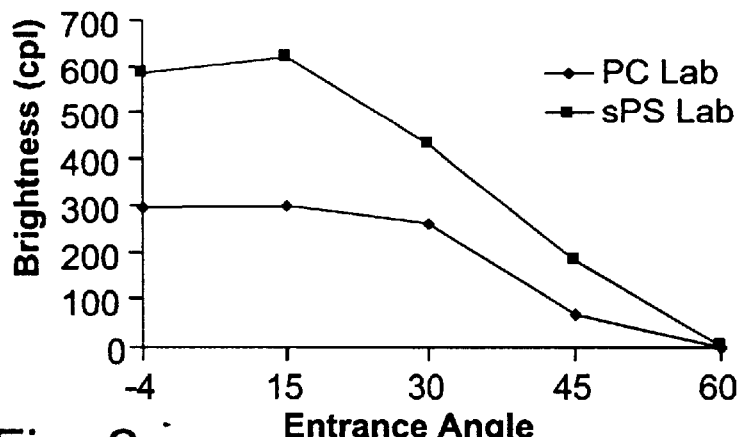
FIG. 2 is a graphical comparison of the Brightness in CandlePower as a function of the Entrance Angle in Degrees for the retroreflective sheetings of EXAMPLE 2 and COMPARATIVE EXAMPLE C1, illustrating, for the case of an orientation angle of 0° and an observation angle of 0.33°, the superiority at all entrance angles of the sheeting of EXAMPLE 2.
Figure 3:
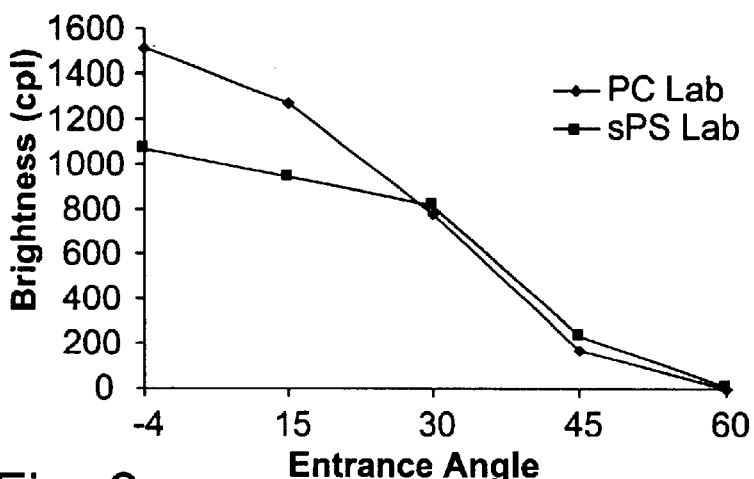
FIG. 3 is a graphical comparison of the Brightness in CandlePower as a function of the Entrance Angle in Degrees for the retroreflective sheetings of EXAMPLE 2 and COMPARATIVE EXAMPLE C1, illustrating, for the case of an orientation angle of 0° and an observation angle of 0.5°, the superiority at all entrance angles of the sheeting of EXAMPLE 2.
Figure 4:
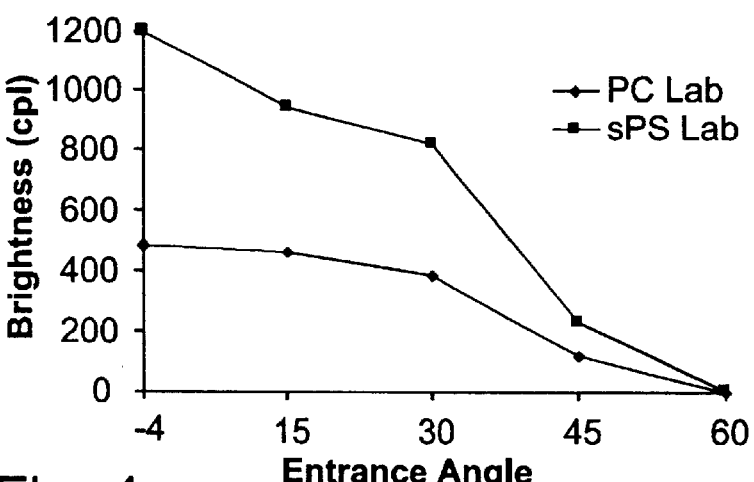
FIG. 4 is a graphical comparison of the Brightness in CandlePower as a function of the Entrance Angle in Degrees for the retroreflective sheetings of EXAMPLE 2 and COMPARATIVE EXAMPLE C1, illustrating, for the case of an orientation angle of 0° and a very small observation angle of 0.2°, the superiority at entrance angles smaller than about 30° of the sheeting of COMPARATIVE EXAMPLE 2, and the equivalent-to-superior performance at entrance angles larger than about 30° of the sheeting of EXAMPLE 2.

In FIGS. 2 and 3, the brightness of sPS microprismatics far exceeds that obtained for PC at observation angles of 0.33° and 0.5° and this superiority is maintained over the entire accessible range of entrance angles. Data (not shown) obtained at many observation angles indicates that this situation persists at all observation angles larger than 0.33°. FIG. 4 shows that, for the smallest experimentally accessible observation angle of 0.2°, the sPS material underperforms PC for entrance angles below about 30°, but for larger entrance angles, the brightness of the sPS microprismatic meets or exceeds that of the PC. Clearly, the implication of these three FIGS. is that, for low entrance angles, retroreflected light is being dispersed into a wider "cone of light" by sPS than by PC, with brightness being higher at most observation angles, but somewhat lower at the very smallest observation angles; while for large entrance angles, the sPS surprisingly widens the retroreflected cone of light without detracting from performance at the smallest observation angles. This implies that for the larger entrance angles, the sPS may be providing an absolute increase in total retroreflected intensity (integrated over all observation angles). This is a very unexpected result for a polymer lacking any advantage in refractive index. At minimum, the data must be interpreted as indicating an increase in retroreflected intensity for all observers other than those quite precisely aligned (closer than 0.2°) with the light source, which is almost equally advantageous. It is believed that process optimization may further improve performance of sPS relative to PC.

Figure 5:
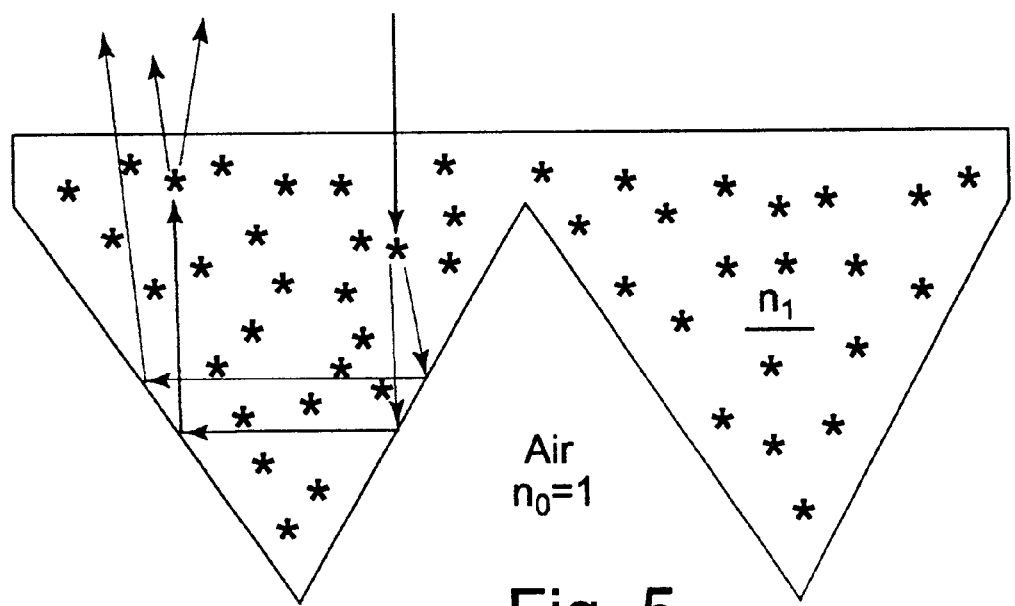
FIG. 5 is a schematic drawing illustrating one possible explanation for the the observation-angle dependence of the optical behavior of the sheeting of EXAMPLE 2; to wit, that light scattering from the semicrystalline structure of sPS causes the redistribution, to larger observation angles, of light retroreflected from the cube-corner element of EXAMPLE 2, resulting in increased brightness at larger observation angles, and decreased brightness at the smallest observation angles, for the case of small entrance angles.

Without wishing to be bound by any particular theory, it seems plausible to presume that light entering an sPS cube-corner element is scattered slightly by the crystalline microstructure, causing an increase in the divergence of the retroreflected light, as shown schematically in FIG. 5. That is, it is believed that light is dispersed toward larger observation angles by properties of the material of construction itself, in contrast to the systems disclosed in U.S. Pat. Nos. 3,712,716 (Stamm), 3,817,596 (Tanaka), 4,775,219 (Appledorn, et al.), and PCT Appl. Ser. No. 96/30786 (Nilsen), which rely on changes in optical construction (geometry) to spread the cone of light to larger observation angles. This effect renders an sPS cube-corner retroreflective construction brighter at larger observation angles than is the case for PC, for any given cube-corner geometry.

Assuming the mechanism proposed above for spreading light is essentially correct, any of the aforementioned semi-crystalline polymers which can be formed into transparent articles could be made to provide optical advantages similar to those detailed in this invention. One skilled in the art of polymer processing will appreciate that, through the use of nucleating agents, stretch-orientation, melt-quenching, or other techniques for manipulating the size and amount of crystalline entities, additional semicrystalline polymers not listed above may also be made to provide similar benefits. However, its combination of high index of refraction, good processing characteristics, thermal stability, hydrophobicity, and dimensional stability with respect to both temperature and humidity, makes sPS a preferred cube-corner retroreflective material.

sPS is a member of the broader class of syndiotactic vinyl aromatic polymers, and such resins useful in the instant invention can have a wide range of compositional characteristics, such as molecular weight and its distribution, monomer and comonomer identity, comonomer content, level of syndiotacticity, grafting or long chain branching, and the like.

Syndiotactic vinyl aromatic polymers useful in the current invention include, but are not limited to, the syndiotactic varieties of poly(styrene), poly(alkyl styrene)s, poly(aryl styrene)s, poly(styrene halide)s, poly(alkoxy styrene)s, poly (vinyl ester benzoate), poly(vinyl naphthalene), poly (vinylstyrene), and poly(acenaphthalene), as well as the hydrogenated polymers and mixtures or copolymers containing these structural units. Examples of poly(alkyl styrene)s include the isomers of the following: poly (methylstyrene), poly(ethylstyrene), poly(propylstyrene), and poly(butylstyrene). Examples of poly(aryl styrene)s include the isomers of poly(phenylstyrene). As for the poly(styrene halide)s, examples include the isomers of the following: poly(chlorostyrene), poly(bromostyrene), and poly(fluorostyrene). Examples of poly(alkoxy styrene)s include the isomers of the following: poly(methoxystyrene) and poly(ethoxystyrene). Among these examples, preferable styrene group polymers are: polystyrene, poly(p-methyl styrene), poly(m-methyl styrene), poly(p-tertiary butyl styrene), poly(p-chlorostyrene), poly(m-chlorostyrene), poly(p-fluorostyrene), and copolymers of styrene and p-methylstyrene. Of these polymers, polystyrene, poly(p-fluorostyrene), poly(p-methylstyrene) and copolymers of styrene and p-methylstyrene are most preferred.

Syndiotacticity can be qualitatively and quantitatively determined by NMR analysis using the carbon isotope method ($^{13}$C-NMR). The tacticity as determined by the $^{13}$C-NMR method can be indicated in terms of either the weight percent of a polymer which has a syndiotactic configuration or in terms of the proportions of structural units (diads and pentads) continuously connected to each other in the syndiotactic configuration. In terms of the first approach, preferred syndiotactic polymers of the invention include about 20 to 100, preferably 30 to 98, more preferably 85 to 95, percent by weight of syndiotactic chain segments. In terms of the second approach, preferred syndiotactic polymers have a syndiotacticity such that the proportion of the racemic diad is at least 75%, preferably at least 85%; and the proportion of racemic pentad is at least 30%, preferably at least 50%.

In some cases, the syndiotactic vinyl aromatic polymer may be grafted, copolymerized, or blended with various other monomeric or polymeric species to impart desired properties to the microprismatic retroreflective film or sheeting. For example, the microprismatic retroreflective film or sheeting may comprise a polymer blend of a syndiotactic vinyl aromatic polymer and optionally, other kinds of syndiotactic and/or nonsyndiotactic polymers. Care must be taken in formulating such blends that the film or sheeting not be opacified via phase separation of the blend. Within this restriction, other kinds of polymers may be selected from among polyolefins such as polyethylene, polypropylene, polybutene, or polypentene; polyesters such as polyethylene terephthalate, polybutylene terephthalate, or polyethylene naphthalate; polyamides, polythioethers, polysulfones, polyurethanes, polyethersulfones, polyimides, halogenated vinyl polymers such as those sold under the tradename TEFLON™, combinations of these, and the like. For polymer blends, preferably 0.01 to 50 parts by weight of other kinds of polymer(s) may be used per 100 parts by weight of syndiotactic vinyl aromatic polymer(s). In some embodiments, a syndiotactic polystyrene may be blended with varying amounts of isotactic or atactic polystyrene.

While one preferred syndiotactic polystyrene polymer used in the present invention may be derived substantially entirely from unsubstituted styrene monomer, varying amounts of other copolymerizable monomers, some of which may contain alkyl, aryl, and other substituents, are more preferably incorporated into the polymer. Incorporation of a comonomer into a polymer serves both to slow the rate of crystallization from the melt, and limit the size of the crystallites. Thus, less aggressive quenching conditions are required for processing the copolymers into transparent films or sheeting than is the case for homopolymer. For example, a preferred syndiotactic polystyrenic copolymer may be derived from monomers comprising about 100 parts by weight of styrene monomer and up to about 20 parts by weight of one or more other copolymerizable monomers, which may or may not possess pseudoasymmetry. Representative examples of such other monomers, in addition to the monomers for the homopolymers listed above in defining the syndiotactic vinyl aromatic polymers group, include olefin monomers, such as ethylene, propylene, butenes, pentenes, hexenes octenes and decenes; diene monomers such as butadiene and isoprene; cyclic olefin monomers; cyclic diene monomers; or polar vinyl monomers, such as methyl methacrylate, maleic anhydride, and acrylonitrile.

A particularly preferred syndiotactic polystyrenic copolymer is derived from 100 parts by weight styrene and 1 to 20, preferably 5 to 15, parts by weight paramethylstyrene. Incorporating such amounts of paramethylstyrene monomer into the polystyrene copolymer has been found to improve the transparency of the resulting microprismatic retroreflective film or sheeting. One example of a particularly preferred vinyl aromatic, syndiotactic polystyrenic polymer derived from 100 parts by weight styrene and 7 parts by weight of paramethylstyrene, is commercially available under the trade designation QUESTRA™ 406 from Dow Chemical Company.

The molecular weight of the vinyl aromatic, syndiotactic polymer utilized in the films and sheeting of the present invention is not critical in many applications. Polymers having molecular weights within a wide range may be used with beneficial results. Generally, the weight average molecular weight ($M_w$) may be at least 10,000, preferably 50,000 to 3,000,000, and more preferably 50,000 to about 400,000. Likewise, the molecular weight distribution is not critical in many applications, and may be narrow or broad. For example, the ratio of $M_w:M_n$ may be 1.0 to 10, wherein $M_n$ is the number average molecular weight.

The microprismatic retroreflective film or sheeting of the present invention may optionally comprise one or more additives to enhance the physical properties of the film or sheeting. For example, the film or sheeting may comprise colorants, inorganic fillers, ultraviolet ("UV") absorbers, light stabilizers, free radical scavengers, antioxidants, antistatic agents, processing aids such as antiblocking agents, lubricants, cross-linking agents, other additives and combinations thereof. Colorants typically are added at about 0.01 to 0.5 weight percent, based upon 100 parts by weight of the syndiotactic polymer.

Most polymeric films which are to be used in signing and other outdoor applications are stablized against UV degradation by compounding the base resin with UV absorbing (UVA) additives and/or other compounds that act as excited state quenchers, hydroperoxide decomposers, or free radical scavengers. Hidered-amine light stabilizers (HALS) have been found to be particularly good radical scavengers. UVA additives act by absorbing radiation in the UV region of the spectrum. HALS on the other hand, behave by quenching radicals generated within the polymer matrix during exposure to UV radiation. A review of the types of materials used to improve UV stability may be found in R. Gachter, H. Muller, and P. Klemchuk (Editors), "Plastics Additives Handbook", pp. 194–95 ($3_{rd}$ Ed., published by Hanser Publishers, New York).

UV absorbers typically are added at about 0.5 to 2.0 weight percent based upon 100 parts by weight of the syndiotactic polymer. Illustrative examples of suitable UV absorbers include derivatives of benzotriazole such as TINUVIN™ 327, 328, 900, and 1130, and TINUVIN-P™, available from Ciba-Geigy Corporation, Ardsley, N.Y.; chemical derivatives of benzophenone such as UVINUL™ M40, 408, and D-50, available from BASF Corporation, Clifton, N.J.; SYNTASE™ 230, 800, and 1200 available from Neville-Synthese Organics, Inc., Pittsburgh, Pa.; chemical derivatives of diphenylacrylate such as UVINUL™ N35, and 539, also available from BASF Corporation of Clifton, N.J.; oxanilides such as Sanduvor VSU, available from Sandoz Corp.; triazines such as Cyasorb UV 1164, available from Cytac Industries; and salicylate derivatives.

Light stabilizers that may be used include hindered amines, which are typically used at about 0.5 to 2.0 weight percent, based upon 100 parts by weight of the syndiotactic polymer. Examples of hindered amine light stabilizers include TINUVIN™ 144, 292, 622, and 770, and CHIMASSORB™ 944 all available from the Ciba-Geigy Corp., Ardsley, N.Y., and 2,2,6,6-tetraalkyl piperidine compounds. Free radical scavengers may also be used, typically, at about 0.01 to 0.5 weight percent, based upon 100 parts by weight of the syndiotactic polymer.

Suitable antioxidants include phosphorous antioxidants, including monophosphites and diphosphites, and phenolic antioxidants. Suitable monophosphites for use in the microprismatic retroreflective film or sheeting of the present invention include, but are not limited to, tris(2,4-tert-butylphenyl)phosphite) and tris(mono- or di-nonylphenyl) phosphite. Diphosphite antioxidants suitable for use in the present invention, include, but are not limited to, distearylpentaerythritol diphosphite, and dioctylpentaerythritol diphosphite. Representative examples of phenolic antioxidants include 2,6-ditertbutyl-4-methylphenol, 2,6-diphenyl-4-methoxyphenol and 2,2-methylenbis(6-tertbutyl-4-methylphenol). Also suitable for use as antioxidants in the present invention are hindered phenolic resins such as IRGANOX™ 1010, 1076, 1035, 1425, or MD-1024, or IRGAFOS™ 168, commercially available from the Ciba-Geigy Corp., Ardsley, N.Y.

In a preferred embodiment, the microprismatic retroreflective film or sheeting contains an amount of the IRGANOX™ 1425 antioxidant effective to enhance the transparency of the film or sheeting. This antioxidant has a melting point of about 260° C., which is about the same as the melting point of a syndiotactic polystyrene polymer. This material is believed to enhance transparency by reducing the rate of crystallinity of the syndiotactic polystyrene as the polymer solidifies from a molten state. Specifically, it is preferred that this antioxidant be present in an amount of from about 0.0001 to 2 parts by weight, more preferably, from about 0.001 to 1 parts by weight, and most preferably, from about 0.01 to 0.5 parts by weight per 100 parts by weight of the syndiotactic vinyl aromatic polymer.

Small amounts of other processing aids, typically no more than one part by weight per 100 parts by weight of the syndiotactic vinyl aromatic polymer, may be added to improve the polymer's processability. Useful processing aids include fatty acid esters, or fatty acid amides available from Glyco Inc., Norwalk, Conn., metallic stearates available from Henkel Corp., Hoboken, N.J., or WAX E™ available from Hoechst Celanese Corporation, Somerville, N.J.

If desired, the syndiotactic vinyl aromatic polymer may also contain substances such as flame retardants that optimize the overall properties of the resultant film or sheeting.

Inorganic fillers suitable for use in the microprismatic retroreflective films or sheeting of the present invention include, for example, oxides, hydroxides, sulfides, nitrides, halides, carbonates, acetates, phosphates, phosphites, organic carboxylates, silicates, titanates or borates of the group IA, IIA, IVA, VIA, VIIA, VIII, IB, IIB, IIIB or IVB elements, as well as hydrated compounds thereof For example, suitable inorganic fillers comprising a group IA element include lithium fluoride and borax (the hydrate salt of sodium borate). Suitable inorganic fillers comprising a group IIA element include magnesium carbonate, magnesium phosphate, magnesium oxide and magnesium chloride. Other suitable inorganic fillers comprising the aforementioned group elements are disclosed in U.S. Pat. No. 5,188,930 (Funaki et al.), incorporated herein by reference.

The use of such inorganic fillers, however, will be governed by the effects they may have on the optical performance of the microprismatic retroreflective film or sheeting. It will be apparent to one skilled in the art that refractive index, particle size, and loading level all have a potential impact on optical performance of the present invention, which will serve to limit the use of inorganic fillers.

However, such particulate inorganic fillers could be added to high index of refraction amorphous polymers, such as polycarbonate, polymethyl methacrylate, or atactic polystyrene, to yield a similar refractive effect to that described above for unfilled semicrystalline sPS. Thus, particulate inorganic fillers, of appropriate particle sizes and at appropriate loading levels, could be used as optically refracting elements in a manner similar to that of the crystalline entities in sPS. Further, such particulate inorganic fillers could be used in a semicrystalline polymer such as sPS to augment or optimize the refractive effect described herein. Additionally, such an effect may also be achieved by combining sPS, or other transparent semicrystalline polymer, with an appropriate amount of an appropriately dispersed incompatible polymer, in the form of a polymer blend.

Neat (unfilled and unblended) sPS, or copolymers thereof, however, provides several other advantageous properties that further differentiates its utility (both optically and in ease of processing) in the retroreflective articles detailed herein and these are discussed below.

sPS has an inherently low surface energy (29.4 dynes/cm), which allows for its removal, with a minimum of effort, from the tooling used for microreplication. This property can be further improved by the use of lubricants and additives well known in the art for the purpose of aiding mold release. Failure of polymers to release cleanly and easily from tooling or molds typically employed in commercial microreplication processing has severely limited the utility of many other amorphous and semi-crystalline polymers.

sPS has a low coefficient of hygroscopic expansion (CHE) and good thermal stability, which render an sPS microprismatic film dimensionally stable when exposed to extremes of environmental temperature and humidity.

Furthermore, coating the sPS microprismatic film with a UV blocking coating, as disclosed in U.S. patent application Ser. No. 08/761,912 (Ojeda) (which is incorporated herein by reference), or laminating a transparent UV absorber loaded overlay film (see, U.S. Pat. No. 4,895,428 (Nelson et al.)) to the microprismatic film or sheeting, further enhances its utility by protecting it from the environment and UV degradation. The former is more preferred in commercial practice as it simplifies the manufacturing process and reduces the cost of the final product.

Microprismatic retroreflective film and sheeting of the present invention may be fabricated using any one of a number of processing techniques (molding, embossing, casting, etc.), and any of the various forms of microprismatic optical tooling disclosed in the art may be utilized.

The thickness of the microprismatic retroreflective film or sheeting is not limited, but must be accommodated by the process conditions. That is, sheets of different thicknesses will require differing quenching conditions to achieve the same levels of crystalline entity size and degree of crystallinity. In some applications, it will be desirable for the retroreflective film or sheeting to be flexible, and in other cases, rigidity will be required by the intended application. These and processing equipment capabilities will determine optimum thickness.

As disclosed in U.S. Pat. No. 4,025,159 (McGrath), a backing or sealing film may be applied to the microprismatic sheeting by heat sealing at discrete locations in a grid-like pattern to prevent the entry of foreign substances (moisture, air-borne pollutants, dirt, etc.) that can reduce the efficacy of the cube-corner film. This film also serves to preserve the air layer adjacent to the cube-corners, thus permitting TIR without the need for metallizing the cube-corner elements.

The following examples, while not intended to be limiting, illustrate various features of the present invention.

Comparative Example C1

Polycarbonate (PC) retroreflective cube-corner film was compression molded using microstructured nickel tooling. The microstructured nickel tooling utilized contains microcube prism recesses of approximately 88 micrometers (0.0035 inch). The microcube recesses were formed as matched pairs of cube corner elements with the optical axis canted or tilted 8.15 degrees away from the primary groove, as generally illustrated in U.S. Pat. No. 4,588,258 (Hoopman). The nickel tooling thickness was approximately 508 micrometers (0.020 inch).

An isotropic, 500 $\mu$m thick PC (Bayer 2407) melt-cast specimen was placed in the molding device between the microstructured nickel tooling and a polished steel plate, to provide an embossed (patterned) surface and an opposing smooth surface.

The specimen was prepared using platen temperatures of 400° F. (204° C.), and a pressure of 25 kpsi for 2 minutes. The pressed specimen was then immediately quenched by rapid immersion into ice water.

Angular brightness measurements were obtained on unsealed specimens using the method described in U.S. Pat. No. 5,138,488 (Szczech), according to U.S. Federal Test Method Standard 370, using an orientation angle of 0°. The angular brightness data is presented in Table 1, and plotted as the curves labelled "PC" in FIGS. 2–4.

TABLE 1

PC Brightness (cp) as a Function of Entrance Angle and Observation Angle

| Entrance Angle (°) | Observation Angle (°) | | |
|---|---|---|---|
| | 0.2 | 0.33 | 0.5 |
| −4 | 1513 | 483 | 295 |
| 15 | 1273 | 459 | 298 |
| 30 | 778 | 386 | 261 |
| 45 | 170 | 118 | 70 |
| 60 | 1.5 | 1.5 | 1 |

EXAMPLE 1

Syndiotactic polystyrene (sPS) cube-corner film was prepared by compression molding a 250 μm thick melt-cast specimen by the procedures described in Comparative Example C1, with the exception that the platen temperatures were 500° F. (260° C.). The sPS resin used reportedly had a weight-averaged molecular weight of 275,000, and contained 14% para-methylstyrene (pMS) as a comonomer. The resin was obtained from the Dow Chemical Company (Midland, Mich.). The melt-cast specimen exhibited an onset temperature for crystallization, $T_c$(onset), of 198° C., a peak temperature for crystallization, $T_c$(peak), of 193° C., and a melting point peak temperature, $T_m$, of 243° C., as measured by differential scanning calorimetry (DSC).

Angular brightness measurements were performed as in Comparative Example C1. The data is presented in Table 2.

TABLE 2 sPS Brightness (cp) as a Function of Entrance Angle and Observation Angle

| Entrance Angle (°) | Observation Angle (°) | | |
|---|---|---|---|
| | 0.2 | 0.33 | 0.5 |
| −4 | 1015 | 1124 | 491 |
| 15 | 841 | 887 | 586 |
| 30 | 692 | 630 | 334 |
| 45 | 202 | 160 | 83 |
| 60 | 3 | 2 | 1.3 |

EXAMPLE 2 sPS cube-corner film was prepared in a manner similar to Example 1. In this example, the sPS resin used (Questra 406—Dow Chemical Company—Midland, Mich.) reportedly had a weight-averaged molecular weight of 325,000, and contained 7% pMS as a comonomer. DSC measurements on the melt-cast specimens indicated a $T_c$(onset) of 197° C., $T_c$(peak) of 185° C., and a $T_m$ of 247° C.

Angular brightness measurements were performed as in Comparative Example C 1. The data is presented in Table 3, and plotted as the curves labelled "sPS" in FIGS. 2–4.

TABLE 3 sPS Brightness (cp) as a Function of Entrance Angle and Observation Angle

| Entrance Angle (°) | Observation Angle (°) | | |
|---|---|---|---|
| | 0.2 | 0.33 | 0.5 |
| −4 | 1069 | 1200 | 586 |
| 15 | 945 | 945 | 620 |
| 30 | 819 | 820 | 413 |
| 45 | 232 | 232 | 184 |
| 60 | 3.3 | 2.5 | 2 |

Comparative Examples C2–C3 sPS cube-corner films were prepared in a manner similar to Example 1. In these examples, the sPS resins used were sPS homopolymer (Example C2) and an sPS copolymer containing 4% pMS (Example C3). The resins were obtained from the Dow Chemical Company (Midland, Mich.), and each reportedly had a weight-averages molecular weight of 275,000. DSC measurements on the melt-cast specimens of Example C2 indicated a $T_c$(onset) of 230° C., $T_c$(peak) of 226° C., and a $T_m$ of 263° C. DSC measurements on the melt-cast specimens of Example C3 indicated a $T_c$(onset) of 217° C., $T_c$(peak) of 212° C., and a $T_m$ of 254° C.

Both films lacked sufficient transparency to be useful in retroreflective signing materials, so angular brightness measurements were not performed.

These two comparative examples serve to demonstrate that quench conditions must be adapted to the polymer resin to be used. As a homopolymer and copolymer of low comonomer content, respectively, the resins of Comp. EXAMPLES C2 and C3 are faster crystallizers than those of EXAMPLES 1 and 2, and thus, require more aggressive quenching conditions to be formed into transparent films of the present invention.

The present invention should not be considered limited to the particular examples described above, but rather should be understood to cover all aspects of the invention as fairly set out in the attached claims. Other embodiments of this invention will be apparent to those skilled in the art, without departing from the true scope and spirit of the invention, upon consideration of this specification or from practices of the invention disclosed herein. Various modifications, omissions, equivalent processes, as well as numerous structures to which the present invention may be applicable will be readily apparent to those of skill in the art to which the present invention is directed upon review of the present specification. The appended claims are intended to cover such modifications and devices.

What is claimed is:

1. A transparent retroreflective film comprising a polymer having an ordered array of integrally formed, interconnected, retroreflecting elements of substantially common shape said film, redirects light towards its originating source with high efficiency due to total internal reflection of light falling on the retroreflecting elements, wherein the film comprises:

a syndiotatic polymer derived from a vinyl aromatic monomer to provide the polymer of the retroreflective film, wherein the film has a retroreflective surface having cube-cornered geometry.

2. The film of claim 1, wherein the syndiotactic polymer is a transparent semicrystalline polymer.

3. The film of claim 1, wherein the syndiotactic polymer comprises at least 80% by weight of styrene moieties.

4. The film of claim 3, wherein the syndiotactic polymer further comprises at least 5% by weight of para-methylstyrene moieties.

5. The film of claim 1, wherein the syndiotactic polymer is syndiotactic polystyrene.

6. The film of claim 1, having at least one microprismatic surface.

7. The film of claim 1, wherein the syndiotactic polymer has at least 20% by weight of syndiotactic chain segments.

8. The film of claim 1, wherein the syndiotactic polymer has between 30% and 98% by weight of syndiotactic chain segments.

9. The film of claim 1, wherein the syndiotactic polymer has at least 85% and 95% by weight of syndiotactic chain segments.

10. The film of claim 1, optionally comprising between about 0.5 and 2.0 parts by weight of a UV absorbing material per 100 parts by weight of the syndiotactic polymer.

11. The film of claim 1, further comprising an antioxidant.

12. The film of claim 11, wherein the antioxidant is present in an amount of between about $1 \times 10^{-4}$ and about 2 parts by weight per 100 parts by weight of the syndiotactic polymer.

13. The film of claim 11, wherein the antioxidant is present in an amount of between about 0.001 and about 1 part by weight per 100 parts by weight of the syndiotactic polymer.

14. The film of claim 11, wherein the antioxidant is present in an amount of between about 0.01 and about 0.5 part by weight per 100 parts by weight of the syndiotactic polymer.

15. The film of claim 11, wherein the antioxidant is a hindered phenolic resin.

16. The film of claim 1, wherein the retroreflective elements provide brightly reflected light at observation angles from about 0.33° to about 0.5°.

17. A sign comprising the film of claim 1.

* * * * *